(12) United States Patent
Morse et al.

(10) Patent No.: US 6,332,522 B1
(45) Date of Patent: Dec. 25, 2001

(54) HYDRAULIC COUPLING FOR VEHICLE DRIVETRAIN

(75) Inventors: David Marshal Morse, Waterford, MI (US); Jun Yoshioka, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/578,727

(22) Filed: May 26, 2000

(51) Int. Cl.$^7$ .................................................. F16D 25/02
(52) U.S. Cl. .......................................... 192/85 AA; 192/35
(58) Field of Search ............................... 192/35, 85 AA, 192/70.12, 70.2, 103 F; 475/88

(56) References Cited

U.S. PATENT DOCUMENTS

| | | |
|---|---|---|
| 4,719,998 | 1/1988 | Hiramatsu et al. . |
| 4,813,856 | 3/1989 | Dlugokecki . |
| 5,593,296 | 1/1997 | Bernstrom et al. . |
| 5,735,764 | 4/1998 | Shaffer et al. . |
| 5,827,145 | 10/1998 | Okcuoglu . |
| 5,888,163 | 3/1999 | Shaffer et al. . |
| 6,076,646 | * 6/2000 | Burns ............................... 192/85 AA |
| 6,112,874 | * 9/2000 | Kopp et al. ...................... 192/85 AA |
| 6,238,315 | * 5/2001 | Morse et al. ............................ 475/88 |

* cited by examiner

Primary Examiner—Charles A Marmor
Assistant Examiner—Saúl Rodríguez
(74) Attorney, Agent, or Firm—Liniak, Berenato, Longacre & White

(57) ABSTRACT

A control valve of a hydraulic coupling controls pumping through a casing inlet port by a hydraulic pump and/or through a casing outlet port to control coupling between two rotary members such as by operation of a clutch. The casing is connected to one of the rotary members while a pumping component embodied by an impeller is connected to the other rotary member and meshed with an internal ring gear having one more tooth than the number of impeller teeth to provide sufficient pumping capacity so that the pump can act as a brake while still having relatively constant pumping pressure. A pressure port plate creates a hydraulic flow path for a gerotor pump and maintains pressure equalization about the gerotor pump. The pressure/torque controlling groove formed in the grooved port plate creates an efficient use of space, and the dimensions and cross sectional area of the groove can be changed easily to produce different pressure/torque curves. Supercharging occurs when the port plate groove connects the pressure and intake apertures (or halves) of the eccentric pump. Supercharging increases the threshold of speed at which harmful cavitation can occur and also reduces the amount of oil that must be drawn into a positive displacement pump.

20 Claims, 5 Drawing Sheets

HYDRAULIC COUPLING FOR VEHICLE DRIVETRAIN

BACKGROUND OF THE INVENTION a) Field of the Invention

This invention relates to a hydraulic coupling for use with a vehicle drivetrain within a housing containing hydraulic fluid to rotatively couple a pair of rotary members about a rotational axis; for example, a speed sensitive limited slip differential.

b) Background of Related Art

Many types of hydraulic devices have utilized internal gear sets, which are often called gerotors or rotors. Such devices can be used as pumps where shaft work is converted to hydraulic work and as motors where hydraulic work is converted to shaft work. In an internal gear pump or motor, an inner gear having outwardly directed teeth cooperates with an external gear having inwardly directed teeth so that fluid chambers therebetween increase and decrease in volume as the inner and outer gears rotate in a housing. By connecting the inlet and outlet of the device to the proper location along the sides of the gear set, the variable displacement chambers receive and discharge hydraulic fluid so that the device can function as a pump or motor. A shaft or other mechanical device can be connected to either the inner or outer gear depending upon the type of device.

Many of the internal gear pumps and motors of the prior art utilize a housing having a fixed inlet and outlet valve port. In other gerotor pumps and motors, a rotary valve plate or disc is used.

The gerotor pump has previously been utilized to couple rotary members of a vehicle drivetrain, particularly a limited slip differential mechanism. However, prior art gerotor pump devices suffer from inadequate or inefficient control of the torque curve and torque transfer characteristic of the pump device. Conventional check valves and other control valve systems suffer from excessive variability in torque distribution, they are difficult to handle and assemble and they require expensive machining in the differential case. Additionally, the conventional valve systems do not adequately control the torque transmission characteristics for the pump.

The need therefore exists for an improved and efficient control valve system that provides an effective hydraulic flow path.

SUMMARY OF THE INVENTION

The present invention provides an improved control valve for use in controlling rotative coupling of a pair of rotary members of a vehicle drivetrain.

In carrying out the above object, the control valve of this invention includes a valve system through which pressurized hydraulic fluid selectively flows to control the coupling of the pair of rotary members. The instant invention provides a grooved pressure port stack which creates a hydraulic flow path for a gerotor pump and maintains pressure equalization about the gerotor pump. The grooved pressure port stack comprises at least one relatively thin circular plate that provides a pocket to equalize pressure in different areas of the gerotor pump and controls the torque curve of the clutch device.

For this invention, a pressure/torque controlling groove is located in the port plate for a variety of reasons including: the control groove fits well into the stacked valve which is particularly suited to a zero end clearance pump such as described below, the control groove creates an efficient use of space, and the dimensions and cross sectional area of the groove can be changed easily to produce different pressure/torque curves.

In addition, supercharging occurs when the port plate groove connects the pressure and intake apertures (or halves) of the eccentric pump. Supercharging increases the threshold of speed at which harmful cavitation can occur and also reduces the amount of oil that must be drawn into a positive displacement pump.

In the preferred embodiment of this invention, the groove is designed into the port or wear plate that seals one face of a zero end clearance eccentric hydraulic pump. The groove acts as an orifice for oil flow, and the relationship of the pressure and flow through the orifice creates a pressure curve. The pressure drives a clutch pack to create a torque curve that is related to vehicle mobility. The groove can connect the pressure port to the sump of the axle or the intake port of the pump for added benefit of supercharging effects.

The objects, features and advantages of the present invention are readily apparent from the following detailed description of the best modes for carrying out the invention when taken in connection with the accompanying drawings.

DETAILED DESCRIPTION OF PREFERRED EMBODIMENTS

Figure 1:
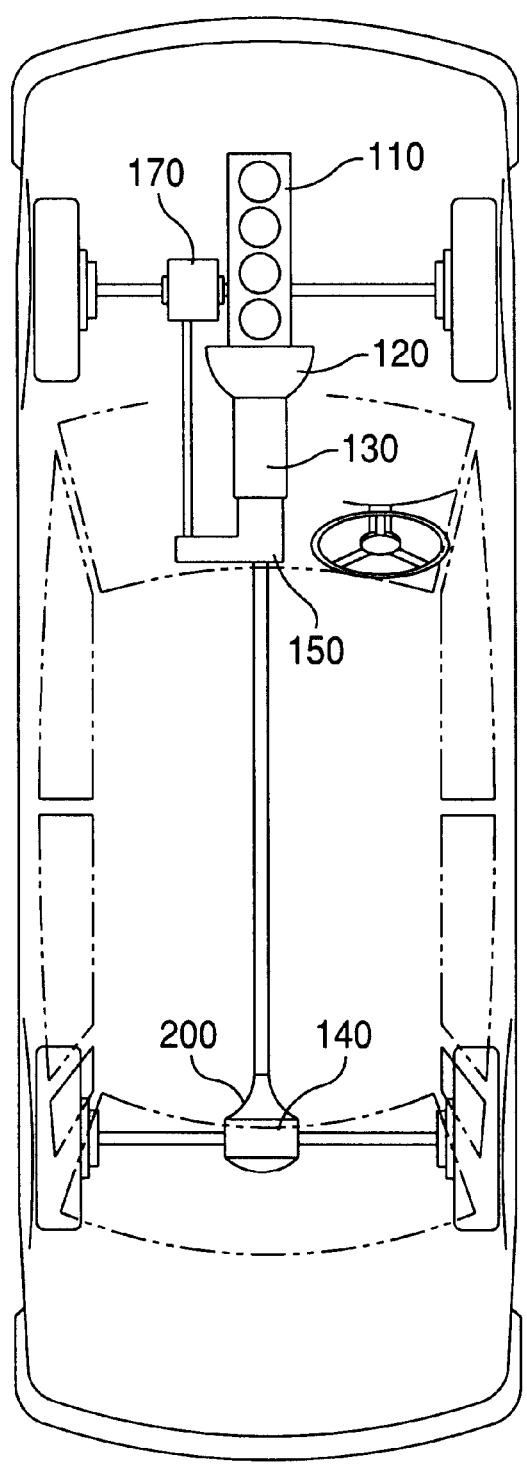
FIG. 1 is a schematic view of a four-wheel-drive vehicle incorporating the speed sensitive limited slip differential assembly of this invention.

With reference to FIG. 1, the four-wheel-drive vehicle provided in accordance with the present invention comprises an engine 110, a transmission 130 which is driven through a clutch 120 by the engine 110 to change the speed of the output rotation of the engine 110. A transfer case 150 divides torque transmission between a first differential 140 that drives a rear wheel systems and a second differential means 170 that drives the front wheel systems.

The first differential 140 is provided with a speed sensitive limited slip clutch system 200. As will be described in greater detail below, the speed sensitive limited slip clutch system 200 comprises an oil pump, i.e. gerotor pump, that is driven by the relative rotation between the vehicle's right and left axles to generate oil pressure corresponding to the speed of the relative rotation. A friction clutch mechanism progressively engages or locks up the differential gear set; i.e., the right and left axles with each other, based on the oil pressure generated by the gerotor pump. The speed sensitive limited slip coupling has such a property that the torque transmitted by the coupling is proportional to the speed of the relative rotation.

It must be understood that, while the present invention is described in relation to a speed sensitive limited slip differential, the present invention is equally suitable for use in a torque coupling mechanism, other hydraulic coupling for a drivetrain, or any other system requiring the inventive check valve system set forth herein.

Figure 2:
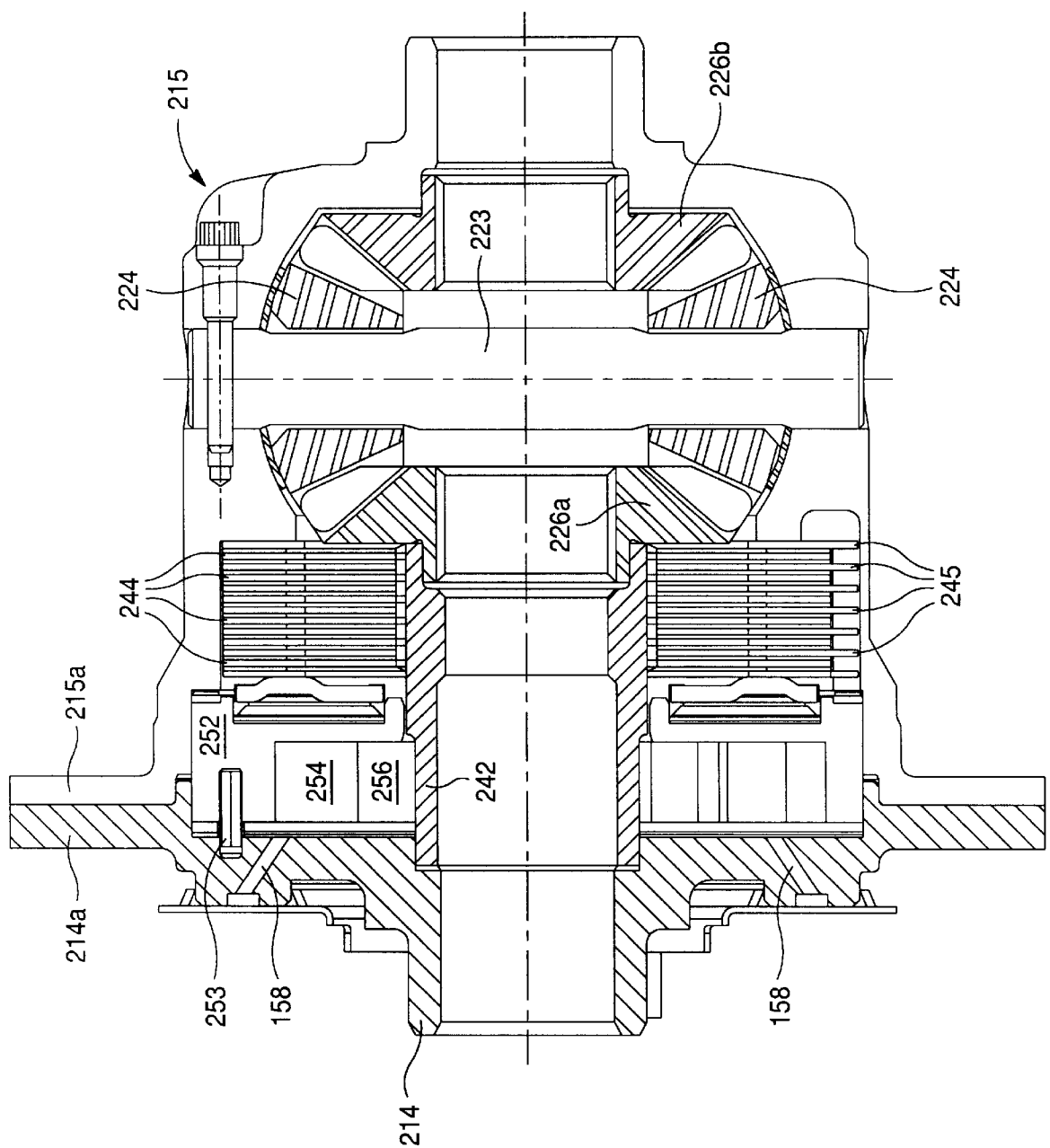
FIG. 2 is a sectional view of a differential assembly incorporating the thin plate check valve assembly of this invention.

FIG. 2 shows the components of the speed sensitive limited slip differential and gerotor pump assembly incorporating the thin plate check valve assembly of this invention. The ring gear (not shown) is bolted or other wise secured to the outer housing 215 at flanges 214a, 215a. The differential assembly shown in cross section includes the differential case 215, pinion gears 224, 224 and side gears 226a, 226b, wherein the pinion gears 224, 224 are mounted on the shaft 223.

Disposed adjacent the side gear 226a is an inner clutch sleeve 242 having external splines. A clutch pack is disposed between the right and left axles (axles shown in FIG. 1). Forming the clutch pack are clutch plates 244 and 245 alternately mounted between the inner clutch sleeve 242 and the differential case 215. The clutch plates 244 mate with the splines formed on the clutch sleeve 242, and the clutch plates 245 mates with splines or notches formed on the inner surface of the case 15. The clutch plates 244 frictionally engage the clutch plates 245 to form a torque coupling arrangement between the differential case and the planetary gearing assembly formed by the pinion gears 224 and side gears 226a, 226b. Torque is transferred from the ring gear to the differential case 215, which drives the pinion shaft 223 and the planetary gear set. As described below, a hydraulic pump actuates the clutch plates depending on the relative rotation between the differential case/ring gear and an impeller or inner rotor 256 of the hydraulic pump.

A speed sensitive fluid pump arrangement 250 actuates a piston member that compresses the clutch pack to increase the frictional engagement between the clutch plates 244, 245. The speed sensitive fluid pump arrangement 250 comprises an outer ring member 252, an outer rotor 254 and an inner rotor 256. The inner rotor 256 mates with the clutch sleeve 242, and the outer ring member 252 mates with the differential case 215 via retention pin 253 (see FIG. 2).

Figure 3:
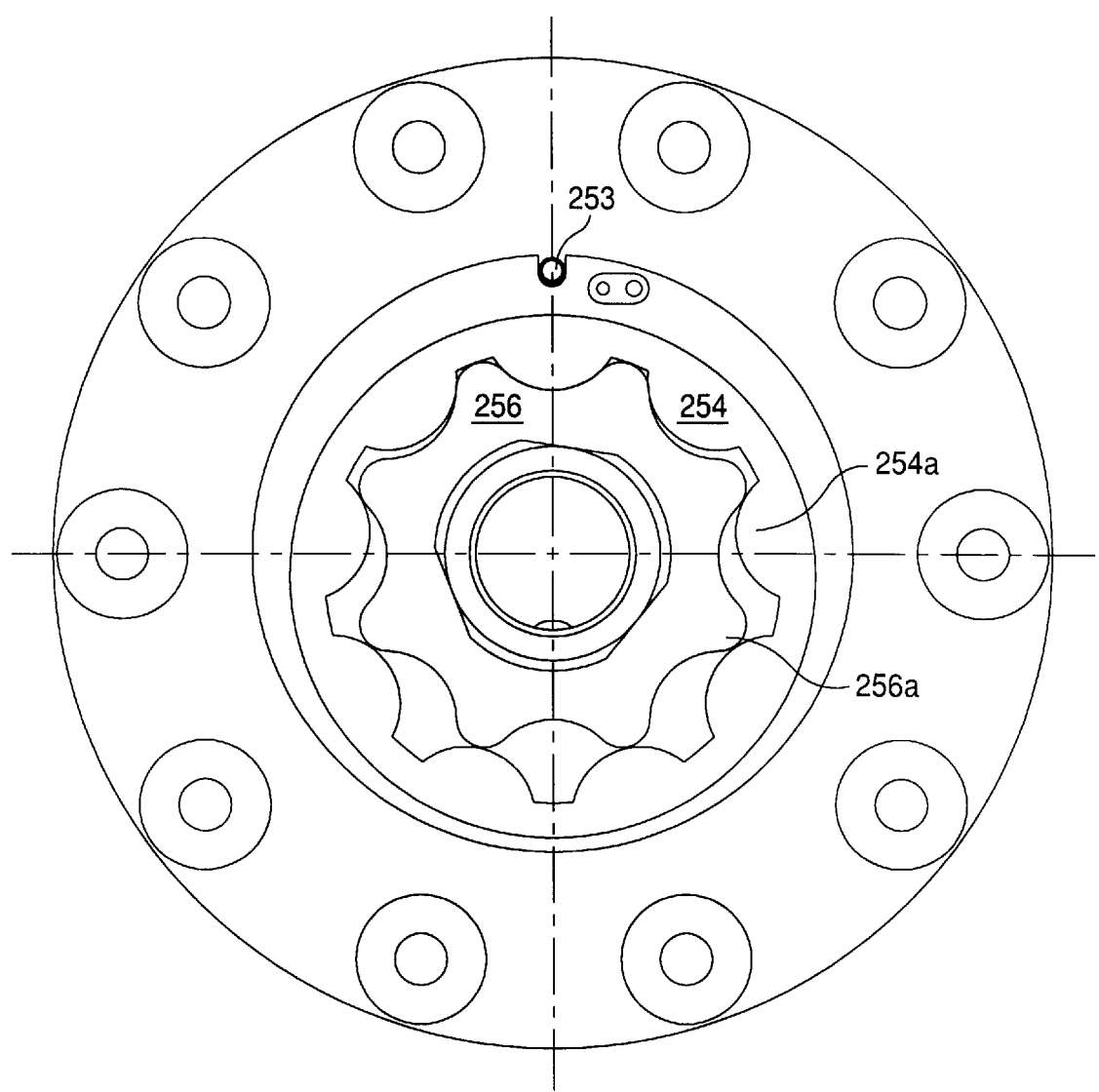
FIG. 3 is cross sectional view of the differential assembly showing components of the gerotor pump.
Figure 4:
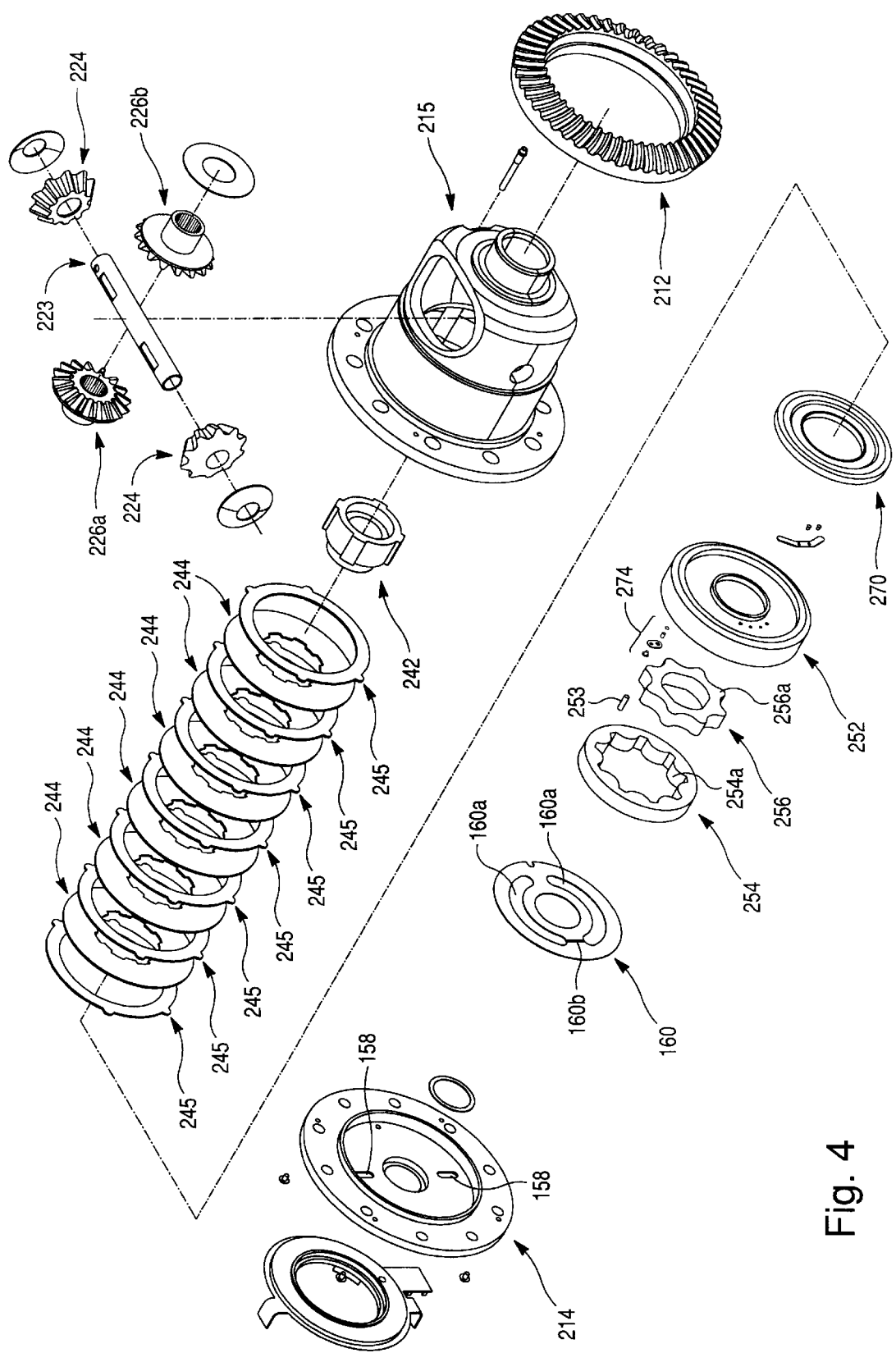
FIG. 4 is an exploded view of the primary components of one embodiment of the present invention.

As illustrated in FIGS. 3 and 4, the inner rotor 256 has one less tooth than the outer rotor 254 and when the inner rotor 256 is driven it will drive the outer rotor 254, which can freely rotate within the outer ring member 252 thus providing a series of decreasing and increasing volume fluid pockets by means of which fluid pressure is created. The structure and operation of the pump will be described in greater detail below.

External to the pump itself, the inner rotor 256 is matingly connected to the clutch sleeve 242, and the sleeve 242 meshes with clutch plates 244. When relative motion takes place between ring gear/differential case 215 and the inner rotor 256/clutch sleeve 242, the inner rotor 256 of pump 250 will create fluid pressure.

With combined reference to FIGS. 3 and 4, the hydraulic (gerotor) pump located within the casing 215 along the rotational axis A includes a pumping component embodied by an impeller 256 having external teeth 256a. The hydraulic pump also includes an internal ring gear 254 mounted on the casing 215 for rotation eccentrically with respect to the toothed impeller 256. The internal ring gear 254 includes internal teeth 254a of a number that is one more than the impeller teeth 256a and which are in a meshing relationship with the impeller teeth to provide a pumping action upon relative rotation between the casing and the toothed impeller. As is hereinafter more fully described, the impeller 256 most preferably has eight teeth 256a and the internal ring gear 254 has nine teeth 254a which is a relationship that provides sufficient pumping capacity so that the hydraulic pump can act effectively as a brake while still having relatively constant pumping pressure without fluid pulsation that would adversely affect the hydraulic coupling provided between the rotary members. It is also possible for the hydraulic pump to have its impeller provided with five or so (N) internal teeth and for the ring gear to have one more tooth (N+1) meshed with the impeller teeth which is a construction that will provide a somewhat greater pumping capacity but less consistency in the fluid pressure but not so inconsistent as to interfere with effective hydraulic coupling between the rotary members. Likewise, other tooth configurations are possible in accordance with this invention.

As shown by FIG. 4, the casing cover 214 has inlets 158 through which hydraulic fluid is pumped into the casing by the hydraulic pump 250. There are actually two of the inlets 158 such that the pumping takes place in both directions of relative rotation between the rotary member embodied by the axle half shaft and the casing 215. In this connection, each of the inlets 158 communicates with the pressure port plate 160 which creates a hydraulic flow path for a gerotor pump and maintains pressure equalization about the gerotor pump. The pressure port plate 160 comprises a relatively thin circular plate provided with at least one pocket, which is formed by arcuate apertures 160a to equalize pressure in different areas of the gerotor pump and a groove 160b to reduce excessive variability in controlling the torque curve related to the vehicle mobility. When the port plate groove 160b connects the pressure and intake apertures (or halves) of the eccentric pump, supercharging occurs. Supercharging increases the threshold of speed at which harmful cavitation can occur and also reduces the amount of oil that must be drawn into a positive displacement pump.

The pressure/torque controlling groove 160b is located in the port plate 160 because the port plate is particularly suited to a zero end clearance pump such as described herein, the groove 160b creates an efficient use of space, and the dimensions and cross sectional area of the groove 160b can be changed easily to produce different pressure/torque curves.

Supercharging occurs when the port plate groove 160b connects the pressure and intake apertures (or halves) of the eccentric pump; i.e, connects the apertures 160a. Supercharging increases the threshold of speed at which harmful cavitation can occur and also reduces the amount of oil that must be drawn into a positive displacement pump.

In the preferred embodiment of this invention, the groove 160b is designed into the port or wear plate 160 that seals one face of a zero end clearance eccentric hydraulic pump. The groove 160b acts as an orifice for oil flow, and the relationship of the pressure and flow through the orifice creates a pressure curve. The pressure drives a clutch pack to create a torque curve that is related to vehicle mobility. The groove 160b can connect the pressure port to the sump of the axle or the intake port of the pump for added benefit of supercharging effects.

Upon one direction of relative rotation between the impeller 256 and the internal gear 254, hydraulic fluid is pumped through the ports 158 into the casing 215. As previously mentioned, the clutch 260, which comprises clutch plates 244, 245, is disposed within the cup-shaped differential case 215 adjacent the junction thereof with the cap member 214 of the casing. The outer ring member 252 receives the hydraulic pump 250 and interfaces with the clutch 260. This outer ring member 252 has an annular piston chamber 252*a* that receives a clutch actuating piston 270 that engages the clutch 260 as is hereinafter more fully described to couple the ring gear 212 and differential case 222 with the right and left axles. Essentially, the clutch plate 244, 245 progressively lock both the right and left axles to the differential case 215 when their relative rotation exceeds a predetermined magnitude.

Outer ring member 252 also has a wall defining a pair of transfer ports 252*b* through which hydraulic fluid is pumped from the hydraulic pump 250 to the clutch actuating piston 270 within the piston chamber 252*a*. This flow through the transfer ports 252*b* is through one of the transfer ports upon one direction of relative rotation between the impeller 256 and the ring gear 212 and is through the other transfer port during the other direction of relative rotation between the impeller and the ring gear. Check valves formed by the plate 258 ensure that the hydraulic fluid pumped through either transfer port to the clutch actuating piston 270 is not pumped back into the hydraulic pump 250 through the other transfer port.

In order to prevent unwanted pressure build-up in the piston chamber 252*a*, a pressure-limiting valve 274 is provided in the wall of the ring member 252 defining the transfer ports 252*b*. In the embodiment of the invention shown in FIG. 4, the pressure relief valve 274 is formed as a ball and spring which are held in place on the back side of the ring member 252 by a retention plate. While FIG. 4 shows one type of pressure relief valve 274, it will be understood by those of skill in the art that various equivalent valve may be use to accomplish the same function of relieving pressure build-up in the piston chamber 252*a*.

Figure 5B:
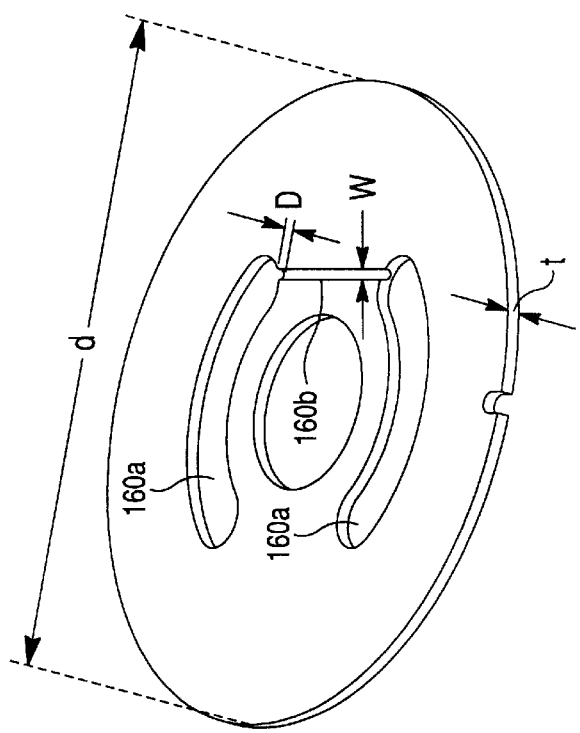
FIG. 5b is a perspective view of the grooved port plate showing the relationship of the arcuate apertures and the groove.
Figure 5A:
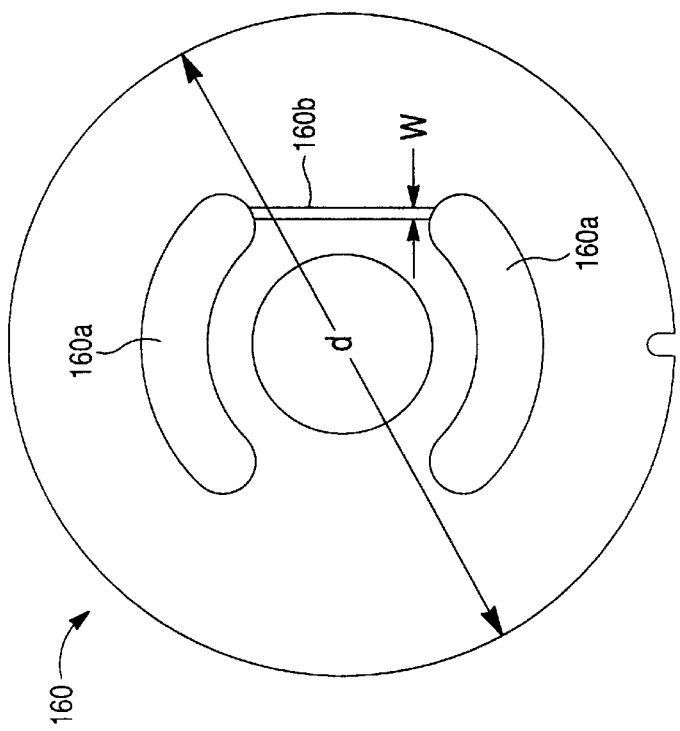
FIG. 5a is a side view of the grooved port plate showing the relationship of the arcuate apertures and the groove.

FIGS. 5*a* and 5*b* are a side view and a perspective view of the grooved port plate 160 showing the relationship of the arcuate apertures 160*a* and the groove 160*b*. In one embodiment of the invention, a port plate 160 having a thickness 't' of about 0.968 mm to 1.032 mm and diameter 'd' of about 102.0 mm to 102.3 mm. The port plate 160 of such dimensions preferably is formed with a groove 160*b* having a groove width 'W' of about 1.0 mm to 3.00 mm and a groove depth 'D' of about 0.06 mm to 0.30 mm; the exact shape and dimensions of the groove being a function of design parameters. As shown in FIG. 6*b*, the depth 'D' is perpendicular to the width 'W' into the front face of the port plate 160. For example, a groove 160*b* may a groove width 'W' of 3.0 mm and a groove depth 'D' of 0.30 mm, a groove width 'W' of 2.0 mm and a groove depth 'D' of between about 0.25 mm and 0.35 mm, and a groove width 'W' of 1.0 mm and a groove depth 'D' of between about 0.06 mm and 0.35 mm. Of course, these specific dimensions should not limit the scope and effect of the present invention; rather, these dimensions are the best mode for the check valve arrangement employed in the pump system described herein.

Essentially, the instant invention provides a grooved pressure port stack which creates a hydraulic flow path for a gerotor pump and maintains pressure equalization about the gerotor pump. The grooved pressure port stack comprises at least one relatively thin circular plate that provides a pocket to equalize pressure in different areas of the gerotor pump and controls the torque curve of the clutch device. For this invention, a pressure/torque controlling groove is located in the port plate for a variety of reasons including: the control groove fits well into the stacked valve which is particularly suited to a zero end clearance pump, the control groove creates an efficient use of space, and the dimensions and cross sectional area of the groove can be changed easily to produce different pressure/torque curves. In addition, supercharging occurs when the port plate groove connects the pressure and intake apertures (or halves) of the eccentric pump. Supercharging increases the threshold of speed at which harmful cavitation can occur and also reduces the amount of oil that must be drawn into a positive displacement pump.

In the preferred embodiment of this invention, the groove is designed into the port or wear plate that seals one face of a zero end clearance eccentric hydraulic pump. The groove acts as an orifice for oil flow, and the relationship of the pressure and flow through the orifice creates a pressure curve. The pressure drives a clutch pack to create a torque curve that is related to vehicle mobility. The groove can connect the pressure port to the sump of the axle or the intake port of the pump for added benefit of supercharging effects.

The present invention has been shown and described with reference to specific embodiments forming the best mode, however various changes in form and detail may be made without departing from the spirit and scope of the invention. While the best modes for carrying out the invention have been described in detail, those familiar with the art to which this invention relates will recognize various alternatives, designs and embodiments for practicing the present invention as defined by the following claims.

What is claimed is:

1. A pumping system through which pressurized hydraulic fluid selectively flows, said pumping system comprising:
   a case member having an inlet port and an outlet port;
   a hydraulic pump in communication with said inlet port and said outlet port;
   an actuator piston member adapted to be actuated by said hydraulic pump;
   at least one disk-shaped port plate comprising first and second port plate apertures passing therethrough and at least one groove recessed into said port plate and extending along a surface of said port plate, said at least one port plate groove providing a fluid connection of said first port plate aperture with said second port plate aperture,
   wherein said port plate groove is adapted to provide a supercharging effect for said pump, to increase the threshold of speed at which harmful cavitation can occur, and to reduce an amount of hydraulic fluid required for a positive displacement pump.

2. The pumping system of claim 1, wherein said port plate seals one face of a hydraulic pump.

3. The pumping system of claim 1, wherein said port plate groove is disposed on a side of said port plate facing said hydraulic pump.

4. The pumping system of claim 1, wherein said port plate groove delivers fluid from a pressurized portion of a hydraulic pump to an intake portion of a hydraulic pump, thereby improving efficiency.

5. The pumping system of claim 1, wherein said port plate groove delivers fluid from a pressurized portion of a hydraulic pump to a sump thereby improving efficiency.

6. The pumping system of claim 1, further comprising a check valve system that controls delivery of fluid driven by a gerotor pump.

7. The pumping system of claim 1, wherein said port plate groove connects a pressure half to an intake half of said gerotor pump.

8. The pumping system of claim 5, wherein said port plate aperture provides at least one pocket to equalize pressure in different areas of the gerotor pump.

9. The pumping system of claim 1, wherein said actuator piston controls a clutch disposed within a torque coupling device.

10. A hydraulic coupling for with a vehicle drivetrain within a housing thereof containing hydraulic fluid to rotatively couple a pair of rotary members about a rotational axis, the hydraulic coupling comprising:

- a casing of a hollow construction that is rotatable within the housing about the rotational axis;
- a hydraulic pump located within the casing along the rotational axis to provide a pumping action upon relative rotation between the two rotary members;
- an inlet port through which hydraulic fluid is pumped into the casing by the hydraulic pump;
- a clutch including a piston chamber located within the casing and having an actuating piston that is received within the piston chamber and driven to engage the clutch and couple the two rotary members to each other;
- the casing including a transfer port through which the pumped hydraulic fluid is fed from the hydraulic pump to the piston chamber;
- an outlet port through which pumped hydraulic fluid flows from the piston chamber; and
- at least one port plate disposed adjacent to said hydraulic pump, said port plate comprising a first port plate aperture disposed adjacent said inlet port, a second port plate aperture disposed adjacent said outlet port passing, and a port plate groove in a face of said port plate,
- wherein said port plate groove establishes a fluid connection between said first and second port plate apertures to thereby enhance operation and efficiency of said hydraulic pump.

11. The hydraulic coupling of claim 10, wherein said port plate groove is adapted to provide a supercharging effect for said pump, to increase the threshold of speed at which harmful cavitation can occur, and to reduce an amount of hydraulic fluid required for a positive displacement pump.

12. The hydraulic coupling of claim 10, wherein said port plate seals one face of said hydraulic pump.

13. The hydraulic coupling of claim 10, wherein said port plate groove is disposed on a side of said port plate facing said hydraulic pump.

14. The hydraulic coupling of claim 10, wherein said port plate groove delivers fluid from a pressurized portion of a hydraulic pump to an intake portion of a hydraulic pump, thereby improving efficiency.

15. The hydraulic coupling of claim 1, wherein said port plate groove delivers fluid from a pressurized portion of a hydraulic pump to a sump thereby improving efficiency.

16. The hydraulic coupling of claim 1, further comprising a check valve system that controls delivery of fluid driven by a gerotor pump.

17. The hydraulic coupling of claim 16, wherein said port plate groove connects a pressure half to an intake half of a gerotor pump.

18. The hydraulic coupling of claim 17, wherein said port plate aperture provides at least one pocket to equalize pressure in different areas of the gerotor pump.

19. The hydraulic coupling of claim 10, wherein said actuator piston controls a clutch disposed within a torque coupling device.

20. The hydraulic coupling of claim 10, wherein said actuator piston controls a clutch disposed within a speed sensitive limited slip differential.

* * * * *